United States Patent Office 3,631,172
Patented Dec. 28, 1971

---

3,631,172
CERTAIN BI[SPIRO(2H-1-BENZOPYRAN-2,2'-BENZOTHIAZOLINE)] COMPOUNDS
René Lucien Gautron, Sceaux, Seine, France, assignor to Compagnie de Saint-Gobain, Neuilly-sur-Seine, France
No Drawing. Filed June 7, 1966, Ser. No. 555,676
Claims priority, application France, June 11, 1965, 20,408
Int. Cl. C07d 91/24
U.S. Cl. 260—304                                4 Claims

ABSTRACT OF THE DISCLOSURE

Photochromic compounds which are useful to change color upon exposure to radiation, comprising di-spiropyrans of the formula

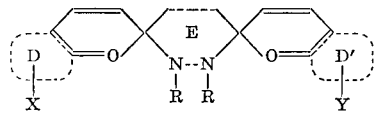

in which, E represents a heterocyclic system having weak or zero absorption in the visible spectrum, D and D' represent mono or polycyclic aromatic or heterocyclic systems capable of combining with substituents X and Y, and X and Y are chosen from H—, $CH_3$—, $C_2H_5$—, $C_6H_5$—, CHO—, $CH_3CO$—, $CH_3O$—, $NO_2$—, CN—, $CH_3COO$—, $CF_3$— and halogens, and R represents aromatic, aliphatic, or aryl-aliphatic radicals, and methods of producing the compounds and devices using the compounds.

---

This invention relates to photochromic compositions, their production and use. It relates more particularly to such compositions containing aryl dispiropyran compounds which have relatively wide radiation absorption ranges and which comprise a nitrogen-containing heterocycle in the molecule.

Numerous photochromic substances are known to be derived from spiropyrans, for example substituted derivatives of trimethyl-1,3,3 indolin 2-spiro-2' benzopyran having the formula:

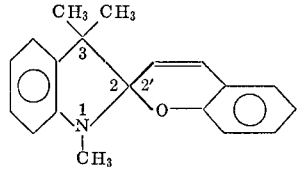

It is know that the absorption bands in the visible spectrum of these spiropyran compounds in their colored form are somewhat narrow and only include part of the visible spectrum; this involves the necessity at times of associating several different photochromic compounds having complementary absorption ranges in order to achieve a wider absorption range in the assembly.

The present invention is based on the discovery by applicant that one can increase the absorption range of a spiropyran compound in its colored form by introducing two spiropyran groups in a single molecule of a photochromic substance.

Accordingly, this invention has for one object dispiropyran compounds, that is compounds containing the spiropyran function twice in the same molecule.

The invention has for further objects a method of producing such compounds and methods of using them.

The photochromic dispiropyran compounds characterizing this invention have the following general formula:

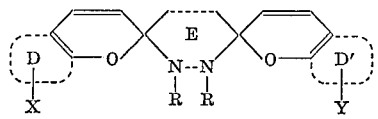

in which: E represents a nitrogenous heterocyclic system having weak or zero absorption in the visible spectrum; D and D' represent mono or polycyclic aromatic or heterocyclic systems capable of combining with substituents X and Y; and X and Y are chosen from the following substituents: H, $CH_3$—, $C_2H_5$—, $C_6H_5$—, CHO—, $CH_3CO$—, $CH_3O$—, $NO_2$—, CN—, $CH_3COO$—, $CF_3$— and halogens.

Among the nitrogenous heterocyclic systems E in this formula may be mentioned, but without limitation, the following:

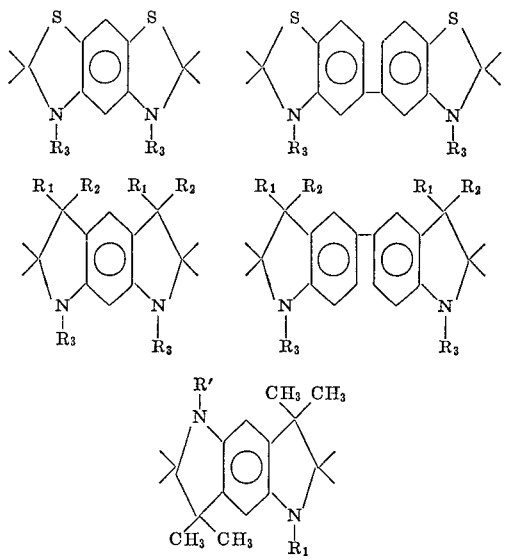

$R_1$, $R_2$ and $R_3$ representing aromatic, aliphatic or arylaliphatic radicals which may be identical or different.

As suitable cyclic systems D and D' may be mentioned, but without limitation, divalent monor or polynuclear aromatic or heterocyclic systems such as residues of phenyl, diphenyl, naphthyl, anthracyl, phenanthryl and pyridyl which form the group consisting of orthophenylene, orthodiphenylene, orthonaphthylene, orthoanthacylen, orthophenanthrylene and orthopyridylene radicals. These cyclic systems may include the substituents X and Y as indicated above.

A process of synthesizing the novel dispiropyran compounds according to this invention comprises reacting a heterocyclic or an aromatic monohydroxymonoaldehyde, such as, for example, a substituted derivative of salicyl aldehyde or hydroxynapthaldehyde, with a nitrogenous dimethylene compound having the structure E, defined above, and having two methylene groups ortho to the two atoms of nitrogen (that is in position 2), or alternatively with a salt of such a nitrogenous dimethylene compound.

Thus in the case in which a substituted salicylaldehyde is used, the synthesis may be represented as follows:

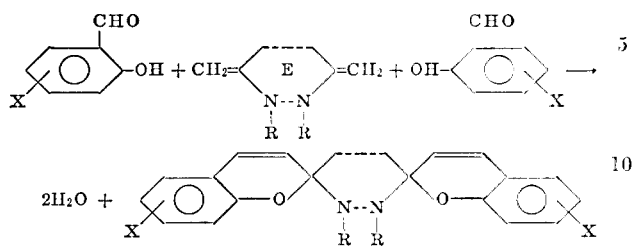

This condensation is effected very simply by bringing into contact the two reactants in stoichiometric ratio, that is two molecules of the hydroxy aldehyde to one molecule of the dimethylene compound.

The condensation is preferably carried out in a solvent for the two reactants, as for example alcohol, benzene, tetrahydrofuran, etc.

Heat in general accelerates the reaction, but it is not essential. The separation of the dispiropyran compound of the invention from the reaction mixture is effected in any suitable way, for example, by precipitation or atmospheric or vacuum evaporation of the solvent.

Applicant has discovered that one obtains particularly useful photochromic dispiropyran compounds starting with the diiodide of bis(ethyl-2, methyl-3, benzothiazolium)-5 having the formula:

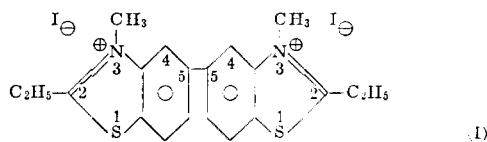

or alternatively with bis(trimethyl-1,3,3 methylene-2 indolinyl)-5, having the formula:

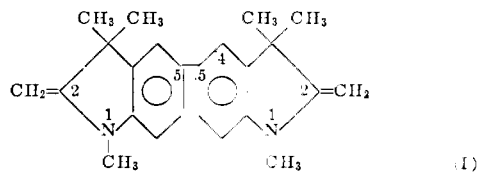

or again with the diiodide of bis(tetramethyl-1,2,3,3 indolinium)-5 of the formula:

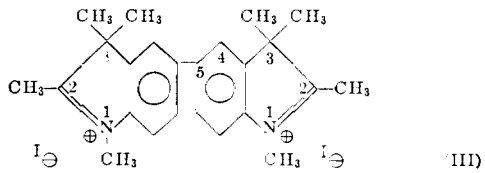

The compounds I and III can be considered as dimethylene compounds for they can react respectively in the forms:

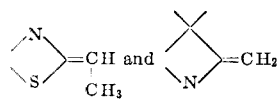

The synthesis of these compounds has been described in the French patent application by the assignee of the present applicant, entitled "Novel Substitution Compounds of Bis-(Benzothiazolyl) and Method of Preparing These Novel Compounds," No. 19,800, filed June 8, 1965 and in the French patent application entitled "Novel Compounds of Bis-(Alcoylidene-2-Indilinyl) and Method of Preparing These Compounds," No. 19,799, filed June 8, 1965.

As concerns the monohydroxy monoaldehydes to be reacted with the nitrogenous dimethylene compounds by the process of this invention, it is preferable to choose derivatives of salicylic aldehyde or of hydroxynaphthaldehydes such as, for example: nitro-5-salicylaldehyde (IV), methoxy-3-nitro-5-salicyladehyde (V), or hydroxy-2-nitro-6-naphthaldehyde (VI).

Below are given by way of example the characteristics of various photochromic substances obtained according to this invention by condensation of the above described reactants. In all cases the condensation is effected by reacting two molecules of hydroxy aldehyde with one molecule of the dimethylene compound in methanol containing a trace of pyridine as the reaction. medium. The reaction is conducted under reflux for a period that may vary from several minutes to several hours as may be necessary. The desired photochromic substance crystallizes from the reaction mixture on cooling and is purified by recrystallization from a suitable solvent.

The following compounds have been prepared by this method:

(1) Bi-(methyl-3-benzothiazoline-2-spiro-2' methyl-3' nitro-6' benzo (b) pyran)-5. Condensation of (I) and (IV).
(2) Bi-(methyl-3 benzothiazoline-2-spiro-2'-methyl-3' nitro-6' methoxy-8' benzo (b) pyran)-5. Condensation of (I) and (V).

These compounds have the formula:

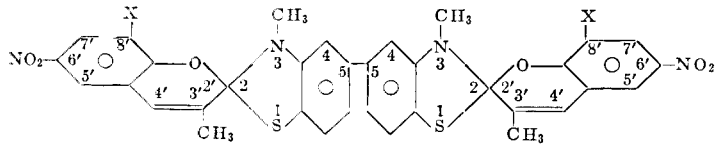

in which X represents H in compound 1 and OCH₃ in compound 2.

(3) Bi-(trimethyl-1,3,3 indolin 2-spiro-2' nitro-6' benzo (b) pyran)-5. Condensation of (II) or (III) and (IV).
(4) Bi-(trimethyl-1,3,3 indolin 2-spiro-2' nitro-6' methoxy-8' benzo b) pyran)-5. Condensation of (II) or (III) with (V).

These compounds have the formula:

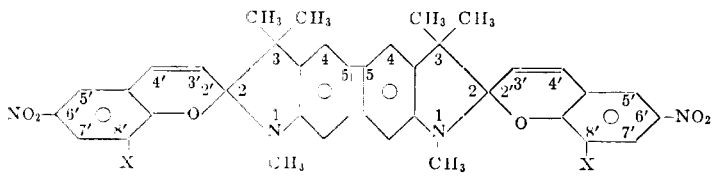

in which X represents H in compound 3 and OCH₃ in compound 4.

(5) Bi-(trimethyl-1,3,3 indolin 2-spiro-2' nitro-7' naphtho (2,1b) pyran)-5. Condensation of (II) or (III) and (VI).

This compound has the formula:

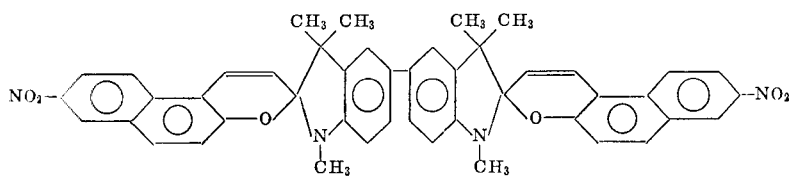

These substances have no definite melting point but decompose before melting.

Microanalysis and determination of nuclear magnetic resonance confirm the structure of these products shown above.

EXAMPLES (A) Examples of photochromism in solution

One-tenth percent toluene solutions are prepared of the above-described, numbered compounds. These solutions are irradiated at the indicated temperatures for 10 seconds with a type SP.500 Philips mercury vapor lamp. The color before and after irradiation is noted and the time required for the solutions to regain their original color after radiation is terminated. The results are summarized in the following table:

TABLE I

| Compounds tested | Temperature of irradiation, °C. | Color | | Time required to regain original color |
|---|---|---|---|---|
| | | Before | After | |
| 1 | 10 | Colorless | Red | 3 minutes. |
| 2 | 10 | do | Red | 5 minutes. |
| 3 | 22 | do | Blue | 30 seconds. |
| 4 | 22 | do | Blue-green | 1 minute. |
| 5 | 0 | Yellow-green | Blue | 3 seconds. |

(B) Photochromism in a semi-rigid medium

A sheet of polyvinyl butyral about 0.5 mm. thick plasticized with butyl sebacate is soaked for 3 to 5 minutes in benzene solution containing 5 percent butyl sebacate and 5 percent of the compound to be tested. The sheet is withdrawn and the benzene removed by evaporation.

The sheets are then irradiated as described in (A), but at room temperature, with the following results:

TABLE II

| Compounds tested | Color | | Time required to regain original color |
|---|---|---|---|
| | Before | After | |
| 1 | Colorless | | 5 minutes. |
| 2 | do | | 7 minutes. |
| 3 | do | Blue | 5 minutes. |
| 4 | Yellowish | Blue | 10 minutes. |
| 5 | Yellow | Blue | 30 seconds. |

(C) Utilization

The photochromic dispiropyran compounds of this invention can be utilized either dissolved in a solvent or in a semi-rigid medium such, for example, as a varnish or a sheet of plastic; the plastic sheet may be protected on both sides by sheets of glass to form triplex assemblies.

Such assemblies may, for example, be used in sun glasses for protection against solar radiation and glare.

Also a sheet of polyvinyl butyral incorporating compound No. 5 as described under (B) above can be placed between two square plates of glass about 2 mm. thick and 20 cm. on each edge and the assembly heated to 120° C. and pressed. The resulting triple plate after cooling has a faint yellow color. When irradiated under the conditions described under (A) above, it assumes a blue color which it loses in about 30 seconds after irradiation is terminated.

As many apparently widely different embodiments of the present invention may be made without departing from the spirit and scope thereof, it is to be understood that the invention is not limited to the specific embodiments.

What is claimed is:

1. A compound having the formula

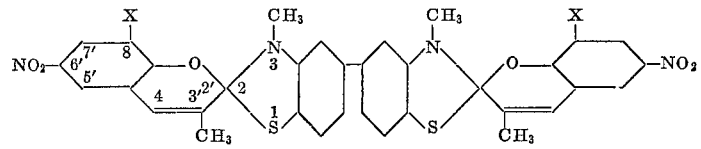

in which X represents H or OCH₃.

2. Bi-(methyl-3 benzothiazolelene 2-spiro-2' methyl 3' nitro-6¹ benzo (b) pyran)-5 having the formula:

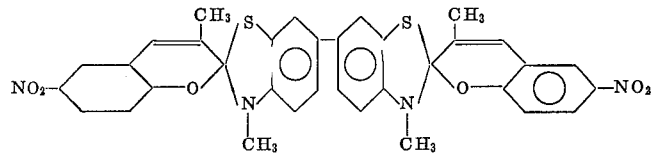

3. B - (methyl-3-benzothiozoline-2-spiro-2' methyl-3' nitro-6'-benzo (b) pyran)-5 having the formula of claim 1.

4. Bi - (methyl - 3-benzothiozoline-2-spiro-2'-methyl-3'-nitro-6'-methoxy-8'-benzo (b) pyran)-5 having the formula of claim 1.

References Cited

FOREIGN PATENTS 887,902   1/1962   Great Britain _____ 260—304

ALEX MAZEL, Primary Examiner

R. J. GALLAGHER, Assistant Examiner

U.S. Cl. X.R.

260—326.11; 252—300; 161—1, 192, 410